US011457177B2

United States Patent
Chiang et al.

(10) Patent No.: US 11,457,177 B2
(45) Date of Patent: Sep. 27, 2022

(54) VIDEO CONFERENCING SYSTEM AND TRANSMITTER THEREOF

(71) Applicant: BenQ Corporation, Taipei (TW)

(72) Inventors: Chin-Fu Chiang, New Taipei (TW); Chen-Chi Wu, Taipei (TW); Chia-Nan Shih, New Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 16/893,873

(22) Filed: Jun. 5, 2020

(65) Prior Publication Data
US 2020/0389622 A1   Dec. 10, 2020

(30) Foreign Application Priority Data
Jun. 6, 2019   (CN) .......................... 201910491888.6

(51) Int. Cl.
| H04N 7/15 | (2006.01) |
| H04N 5/232 | (2006.01) |
| H04W 4/06 | (2009.01) |
| G06F 9/4401 | (2018.01) |
| G06F 13/42 | (2006.01) |

(52) U.S. Cl.
CPC ............ *H04N 7/15* (2013.01); *G06F 9/4413* (2013.01); *G06F 13/4282* (2013.01); *H04N 5/23235* (2013.01); *H04W 4/06* (2013.01); *G06F 2213/0042* (2013.01)

(58) Field of Classification Search
USPC .................................................... 348/14.02
See application file for complete search history.

(56) References Cited

U.S. PATENT DOCUMENTS

| 2005/0091701 A1* | 4/2005 | Hogyoku ............. H04N 21/432 725/147 |
| 2014/0211095 A1* | 7/2014 | Dickens .................. H04N 5/38 348/723 |
| 2018/0227340 A1* | 8/2018 | Jaynes ..................... H04N 7/15 |

FOREIGN PATENT DOCUMENTS

| CN | 102420966 A | 4/2012 |
| CN | 107071302 A | 8/2017 |
| CN | 108028905 A | 5/2018 |
| EP | 3203750 A1 | 8/2017 |

OTHER PUBLICATIONS

Office Action dated Sep. 10, 2020 in Chinese Application No. CN201910491888.6.

* cited by examiner

*Primary Examiner* — Amal S Zenati (57) ABSTRACT

A video conferencing system is disclosed. The video conferencing system includes a transmitter and a receiver. When the transmitter is coupled to a port of an information processing apparatus, the transmitter communicates with the information processing apparatus to determine whether the port of the information processing apparatus has video output function. When the above determination result is no, the transmitter emits a wireless signal. The transmitter is coupled to a display apparatus and used to receive the wireless signal and provide a default warning message to the display apparatus.

15 Claims, 8 Drawing Sheets

VIDEO CONFERENCING SYSTEM AND TRANSMITTER THEREOF

BACKGROUND OF THE INVENTION

1. Field of the Invention

The invention relates to video conference; in particular, to a video conferencing system and a transmitter thereof.

2. Description of the Prior Art

In recent years, because the rapid development of the internet and video processing, users in different places can synchronize video connections through electronic devices such as computers, smartphones, tablets, etc. When the user makes voice calls, he/she can also see the dynamic images of other users through the screen to enhance the realism and presence of communication. Therefore, the video conference with both image and voice transmission has gradually replaced the conference call with voice transmission only, and has become a common and efficient communication method within a company or between different companies.

Although the video conferencing system allows all participants to break through the space limitation to meet together, the conventional video conferencing system still has many shortcomings and needs to be improved.

For example, when a transmitter of the conventional video conferencing system is coupled to an information processing apparatus (such as a notebook), specific software or driver still need to be installed, executed or configured, so the conventional video conferencing system fails to really achieve the "plug and play" operation. In addition, because the conventional video conferencing system is not compatible with all operating systems and hardware platforms, when different participants use different operating systems or hardware platforms, they still need the support of the information department to successfully conduct video conferences. It is quite inconvenient for the users. In addition, in the conventional video conferencing system, when the user wants to switch between the presentation mode and the video playback mode, complicated software settings must be completed first, and the actual wireless video playback performance is still poor.

SUMMARY OF THE INVENTION

Therefore, the invention provides a video conferencing system and a transmitter thereof to solve the above-mentioned problems of the prior arts.

A preferred embodiment of the invention is a video conferencing system. In this embodiment, the video conferencing system is coupled between an information processing apparatus and a display apparatus. The video conferencing system includes a transmitter and a receiver. When the transmitter is coupled to the information processing apparatus, the transmitter transmits an extended display identification data (EDID) to the information processing apparatus, so that the information processing apparatus identifies the transmitter as a virtual display apparatus and provides an image signal to the transmitter, and the transmitter wirelessly transmits the image signal. The receiver is coupled to the display apparatus and configured to wirelessly receive the image signal transmitted by the transmitter and provide the image signal to the display apparatus.

In an embodiment, the EDID is stored in the transmitter, or the EDID is provided from the receiver to the transmitter.

In an embodiment, the transmitter is triggered by a trigger signal to wirelessly transmit the image signal to the receiver.

In an embodiment, the transmitter includes: an image receiving unit configured to receive the image signal with the first format; a first control unit coupled to the image receiving unit and configured to convert the image signal with the first format into the image signal with the second format; and a first wireless transmitting unit coupled to the first control unit and configured to wirelessly transmit the image signal with the second format to the receiver.

In an embodiment, the image receiving unit is a high-definition multimedia interface (HDMI) port and the first format is a HDMI format, or the image receiving unit receives the image signal with the first format and a power signal through a cable supporting universal serial bus (USB) Type-C alternate mode, and the first format is a DisplayPort (DP) format.

In an embodiment, the receiver includes: a second wireless transmitting unit configured to wirelessly receive the image signal with the second format; a second control unit coupled to the second wireless transmitting unit and configured to convert the image signal with the second format into the image signal with the first format; and an image output unit coupled to the second control unit and the display apparatus respectively and configured to output the image signal with the first format to the display apparatus.

In an embodiment, the information processing apparatus includes a display card with a video interface, when the transmitter transmits the EDID to the information processing apparatus, the information processing apparatus performs a standard exchange with the EDID through the video interface of the display card.

In an embodiment, the receiver receives a human interface device (HID) command transmitted by the display apparatus or a peripheral input apparatus through the cable supporting the USB Type-C alternate mode; the receiver wirelessly transmits the HID command to the transmitter, and the transmitter transmits the HID command to the information processing apparatus through the cable supporting the USB Type-C alternate mode.

In an embodiment, the image signal outputted by the information processing apparatus to the transmitter has a first resolution, the transmitter wirelessly transmits and the image signal with the first resolution to the receiver; the receiver adjusts the first resolution of the image signal to a second resolution designated by the receiver, and then the receiver outputs the image signal with the second resolution to the display apparatus.

Another preferred embodiment of the invention is a transmitter. In this embodiment, the transmitter is applied to a video conferencing system. The video conferencing system further includes a receiver. The transmitter includes an image receiving unit, a first control unit and a first wireless transmitting unit. When the transmitter is coupled to an information processing apparatus, the transmitter transmits an extended display identification data (EDID) to the information processing apparatus, so that the information processing apparatus identifies the transmitter as a virtual display apparatus and provides an image signal with a first format to the image receiving unit. The first control unit is coupled to the image receiving unit and configured to convert the image signal with the first format into the image signal with a second format. The first wireless transmitting unit is coupled to the first control unit and configured to wireless transmit the image signal with the second format to the receiver, and then the receiver provides the image signal with the second format to a display apparatus.

Compared to the prior art, the video conferencing system and its transmitter of the invention can effectively improve shortcomings of the prior arts to provide the best wireless video conferencing effect. The advantages and effects of the invention are as follows:

When the transmitter of the video conferencing system of the invention is coupled to the information processing apparatus, the transmitter will only transmit the EDID to the information processing apparatus, so that the information processing apparatus can identify the transmitter as the virtual display apparatus and only transmit the image signal to the transmitter. Since neither the transmitter nor the information processing apparatus needs to install, execute or set any software or driver, it can achieve the real "plug and play" operation.

The advantage and spirit of the invention may be understood by the following detailed descriptions together with the appended drawings.

DETAILED DESCRIPTION OF THE INVENTION

Figure 1:
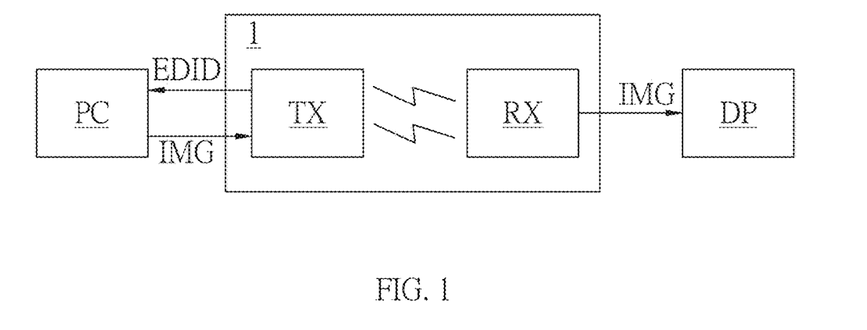
FIG. 1 illustrates a functional block diagram of the video conferencing system 1 in a preferred embodiment of the invention.

A preferred embodiment of the invention is a video conferencing system. Please refer to FIG. 1. FIG. 1 illustrates a functional block diagram of the video conferencing system in this embodiment.

As shown in FIG. 1, the video conferencing system 1 is coupled between an information processing apparatus PC and a display apparatus DP. The video conferencing system 1 includes a transmitter TX and a receive RX. The transmitter TX is coupled to the information processing apparatus PC. The receiver RX is coupled to the display apparatus DP.

When the transmitter TX is coupled to the information processing apparatus PC, the transmitter TX will transmit the extended display identification data EDID to the information processing apparatus PC, so that the information processing apparatus PC will recognize the EDID transmitted by the transmitter TX and identify the transmitter TX as a virtual display apparatus.

In practical applications, the EDID can be stored in the transmitter TX, or the receiver RX can obtain the EDID of the display apparatus DP and provide the EDID to the transmitter TX, but not limited to this. When the transmitter TX transmits the EDID to the information processing apparatus PC, the information processing apparatus PC can perform standard exchange with the EDID through a video interface of its display card, but not limited to this.

When the information processing apparatus PC identifies the transmitter TX as the virtual display apparatus, the information processing apparatus PC will provide an image signal IMG to the transmitter TX and the transmitter TX will wirelessly output the image signal IMG. When the receiver RX wirelessly receives the image signal IMG transmitted by the transmitter TX, the receiver RX will provide the image signal IMG to the display apparatus DP and the image signal IMG will be displayed or projected by the display apparatus DP.

In practical applications, it is assumed that the image signal IMG outputted by the information processing apparatus PC to the transmitter TX has a first resolution (e.g., 1080p) and the image signal outputted by the receiver RX to the display apparatus DP has a second resolution (e.g., 720p). When the transmitter TX receives the image signal IMG with the first resolution (e.g., 1080p) from the information processing apparatus PC, the transmitter TX will wirelessly output the image signal IMG with the first resolution (e.g., 1080p) to the receiver RX. When the receiver RX receives the image signal IMG with the first resolution (e.g., 1080p) from the transmitter TX, the receiver RX will perform scaling on the image signal IMG, for example, the receiver RX adjusts the resolution of the image signal IMG from the first resolution (e.g., 1080p) to the second resolution (e.g., 720p) which is specified by the receiver RX, and then the receiver RX will output the image signal IMG with the second resolution (e.g., 720p) to the display apparatus DP. In fact, the second resolution can be greater than the first resolution; for example, the second resolution (e.g., 4Kp) can be greater than the first resolution (e.g., 1080p). It should be noted that the receiver RX performs scaling on the image signal IMG in this embodiment, but not limited to this.

Figure 2:
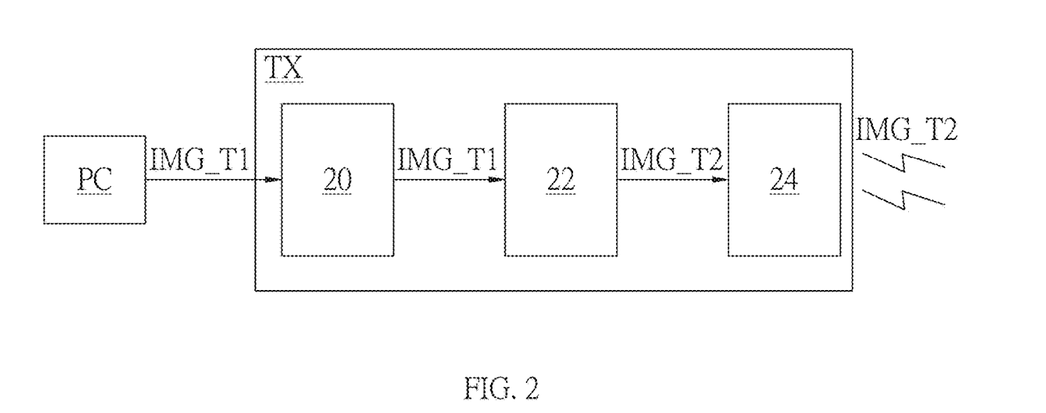
FIG. 2 illustrates a functional block diagram of the transmitter TX in FIG. 1.

Please refer to FIG. 2. FIG. 2 illustrates a functional block diagram of the transmitter TX in FIG. 1. As shown in FIG. 2, the transmitter TX includes an image receiving unit 20, a first control unit 22 and a first wireless transmitting unit 24. The image receiving unit 20 is configured to receive the image signal IMG_T1 with the first format. The first control unit 22 is coupled to the image receiving unit 20 and configured to convert the image signal IMG_T1 with the first format into the image signal IMG_T2 with the second format. The first wireless transmitting unit 24 is coupled to the first control unit 22 and configured to wirelessly transmit the image signal IMG_T2 with the second format to the receiver RX.

In an embodiment, the image receiving unit 20 can be a high-definition multimedia interface (HDMI) port and the first format of the image signal IMG_T1 can be a HDMI format.

In another embodiment, the image receiving unit 20 can receive the image signal IMG_T1 through a cable supporting universal serial bus (USB) Type-C alternate mode and the first format of the image signal IMG_T1 can be a DisplayPort (DP) format, and the cable supporting the USB Type-C alternate mode can also receive power signals at the same time.

In an embodiment, the second format can be an internet protocol (IP) packet to facilitate wireless transmission, but not limited to this.

Figure 3:
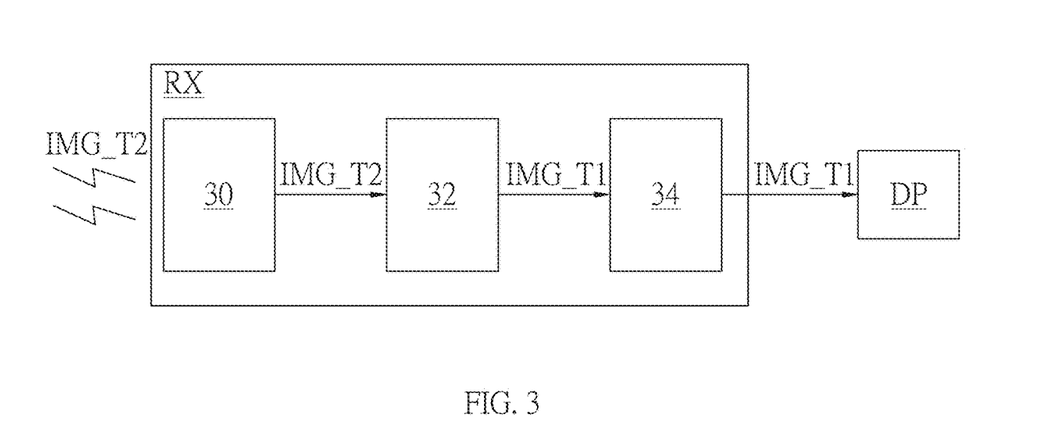
FIG. 3 illustrates a functional block diagram of the receiver RX in FIG. 1.

Please refer to FIG. 3. FIG. 3 illustrates a functional block diagram of the receiver RX in FIG. 1. As shown in FIG. 3, the receiver RX includes a second wireless transmitting unit 30, a second control unit 32 and a video output unit 34. The second wireless transmitting unit 30 is configured to wirelessly receive the image signal IMG_T2 with the second format. The second control unit 32 is coupled to the second wireless transmitting unit 30 to convert the image signal IMG_T2 with the second format into the image signal IMG_T1 with the first format. The image output unit 34 is coupled to the second control unit 32 and the display apparatus DP respectively and configured to output the image signal IMG_T1 with the first format to the display apparatus DP, and the display apparatus DP will display or project the image signal IMG_T1 with the first format.

Figure 4:
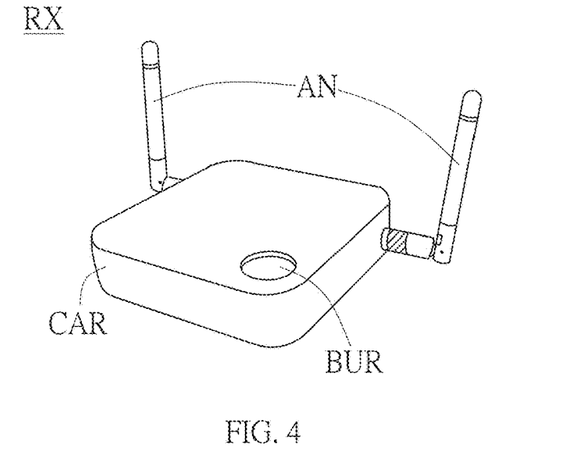
FIG. 4 illustrates a schematic diagram of the appearance of the receiver RX in a preferred embodiment of the invention.

Please refer to FIG. 4. FIG. 4 illustrates a schematic diagram of the appearance of the receiver RX in a preferred embodiment of the invention. As shown in FIG. 4, the receiver RX in the video conferencing system 1 of the invention can further include a casing CAR, a button BUR and an antenna AN. Among them, the button BUR disposed on the casing CAR is a switch button with a light-emitting diode (LED) indicator light for the user to turn on or turn off the receiver RX; the antennas AN is disposed on both sides of the casing CAR and configured to transmit wireless signals and communicate with the transmitter TX.

Figure 5:
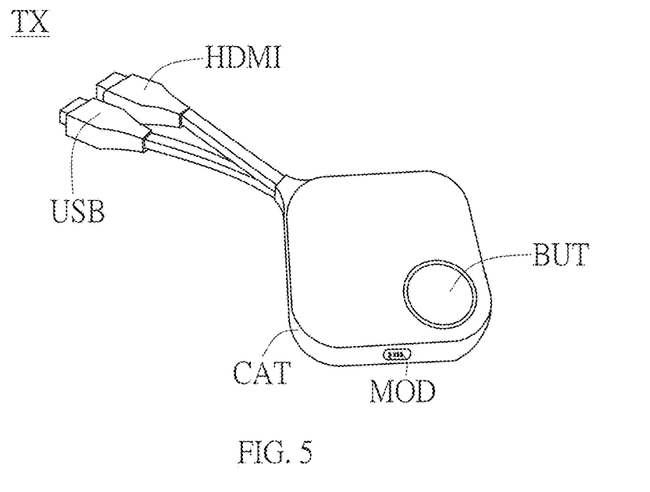
FIG. 5 illustrates a schematic diagram of the appearance of the transmitter TX in a preferred embodiment of the invention.

Please refer to FIG. 5. FIG. 5 illustrates a schematic diagram of the appearance of the transmitter TX in a preferred embodiment of the invention. As shown in FIG. 5, the transmitter TX in the video conferencing system 1 of the invention can further include a casing CAT, a button BUT, a mode switching key MOD, a USB cable and a HDMI cable.

When the user presses the button BUT disposed on the casing CAT, a trigger signal is generated and the transmitter TX is triggered by the trigger signal to start or stop wirelessly transmitting the image signal to the receiver RX; the mode switching kay MOD is configured to be pressed by the user to switch between different operation modes, such as a pairing mode for the transmitter TX and the receiver RX, a projection mode or a video playback mode; the USB cable is configured to couple the USB port to the information processing apparatus PC, and the USB format that the USB cable supports can be USB 2.0 or USB 3.0, but not limited to this; the HDMI cable is configured to couple to the HDMI port of the information processing apparatus PC, and the HDMI format that the HDMI cable supports can be HDMI 1.4 or HDMI 2.0, but not limited to this.

Figure 6:
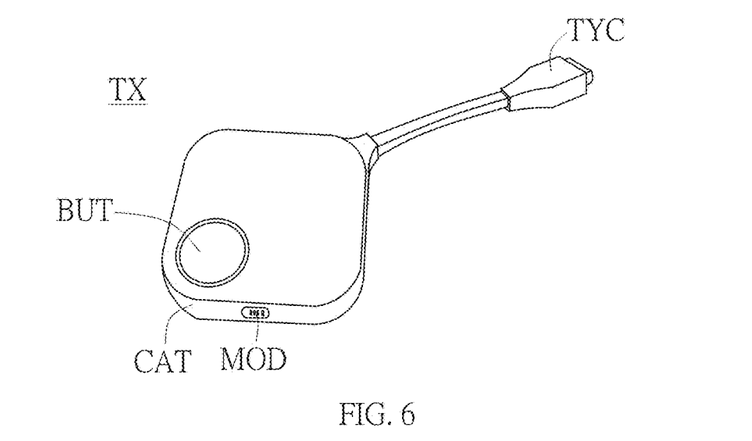
FIG. 6 illustrates a schematic diagram of the appearance of the transmitter TX in another preferred embodiment of the invention.

Please refer to FIG. 6. FIG. 6 illustrates a schematic diagram of the appearance of the transmitter TX in another preferred embodiment of the invention. As shown in FIG. 6, the transmitter TX in the video conferencing system 1 of the invention can further include a casing CAT, a button BUT, a mode switching key MOD and a cable TYC supporting USB Type-C alternate mode.

In this embodiment, the button BUT disposed on the casing CAT is configured to be pressed by the user to start or stop wirelessly transmitting the image signal to the receiver RX; the mode switching key MOD disposed on a side of the casing CAR is configured to be pressed by the user to switch between different operating modes, such as a pairing mode for the transmitter TX and the receiver RX, a projection mode or a video playback mode; the cable TYC supporting the USB Type-C alternate mode is configured to couple to the USB Type-C port of the information processing apparatus PC, and the cable TYC supporting the USB Type-C alternate mode can transmit different signals such as data signals, video signals and power signals, and the USB Type-C format that the cable TYC supports can be Type-C 2.0, Type-C 3.0, Type-C 3.1 (Gen1) or Type-C 3.1 (Gen2), but not limited to this.

Figure 7:
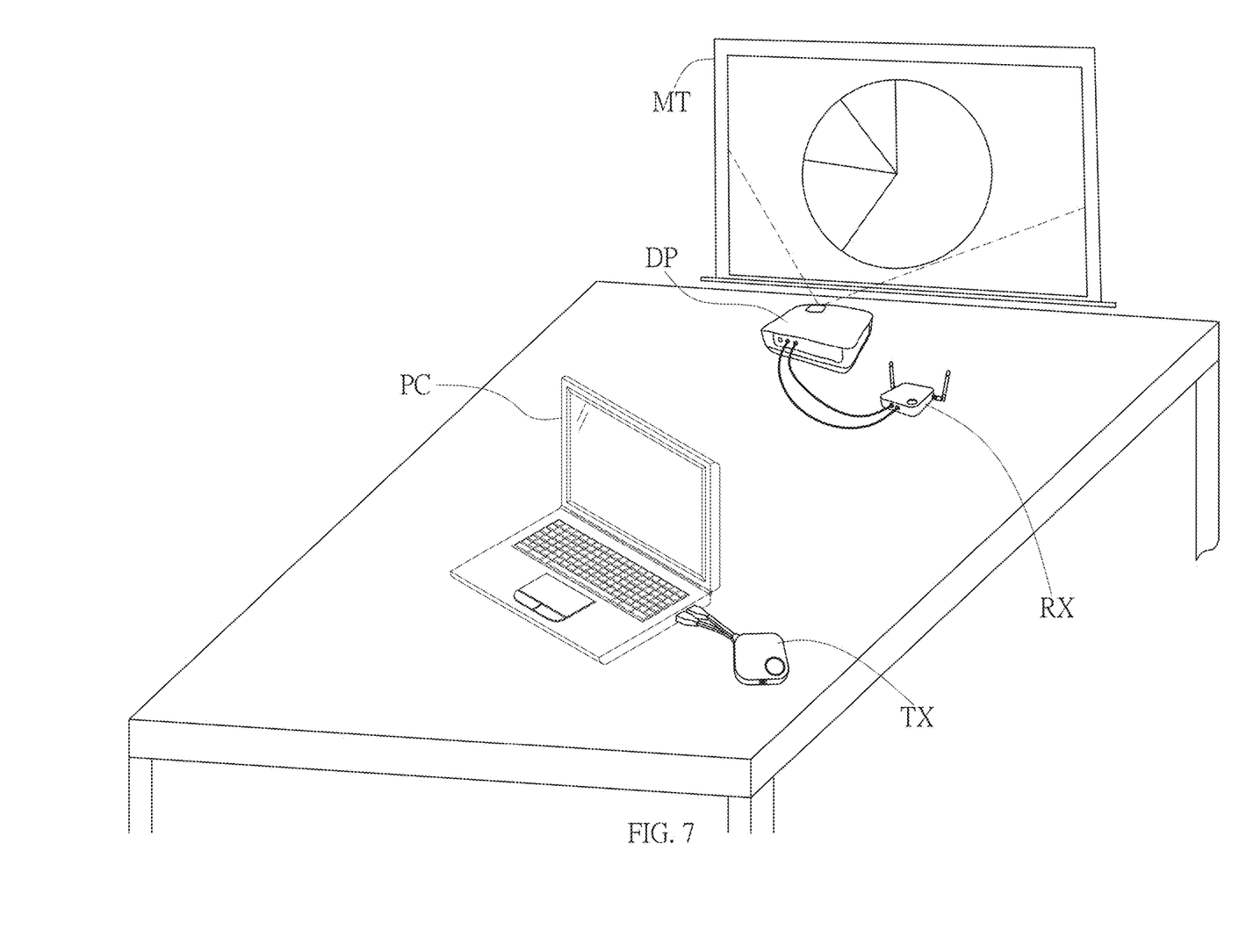
FIG. 7 illustrates a schematic diagram of an application scenario of the video conferencing system 1 of the invention.

Please refer to FIG. 7. FIG. 7 illustrates a schematic diagram showing an application scenario of the video conferencing system 1 of the invention. As shown in FIG. 7, the transmitter TX in the video conferencing system 1 of the invention is coupled to an information processing apparatus PC (such as a notebook, but not limited to this) and the receiver RX in the video conferencing system 1 of the invention is coupled to the display apparatus DP (such as a projector, but not limited to this).

When the transmitter TX is coupled to the information processing apparatus RX, the transmitter TX will transmit the extended display identification data EDID to the information processing apparatus PC, so that the information processing apparatus PC will recognize the EDID transmitted by the transmitter TX and identify the transmitter TX as a virtual display apparatus, and then the information processing apparatus PC will transmit an image signal to the transmitter TX.

When the transmitter TX receives the image signal, the transmitter TX will wirelessly output the image signal to the receiver RX. When the receiver RX wirelessly receives the image signal, the receiver RX will provide the image signal to the display apparatus DP, and the display apparatus DP will project the image signal on a display screen MT.

Figure 8:
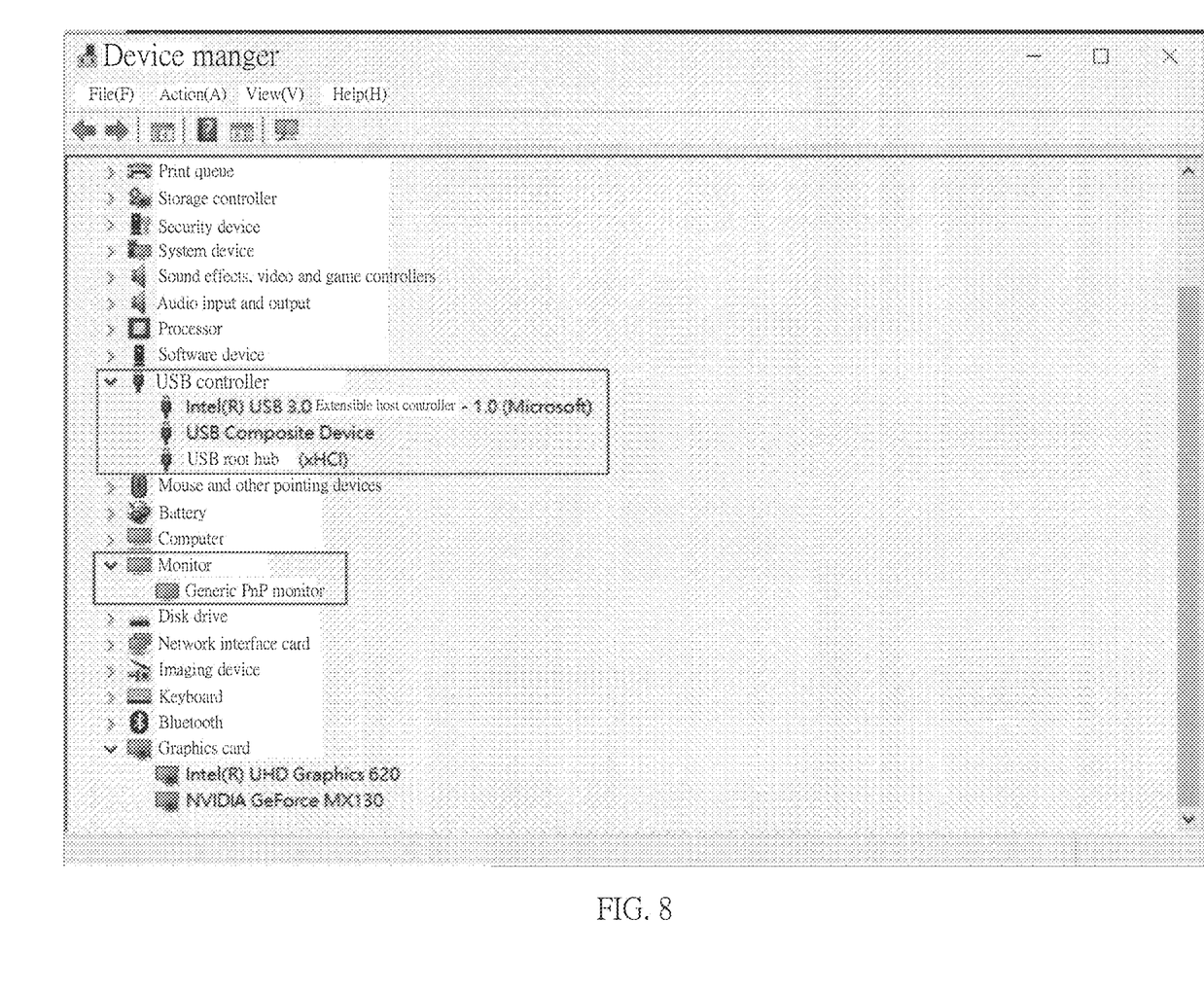
FIG. 8 illustrates a schematic diagram showing that only one monitor is shown on the device manager screen of the information processing apparatus PC when the transmitter TX is not coupled to the information processing apparatus PC.
Figure 9:
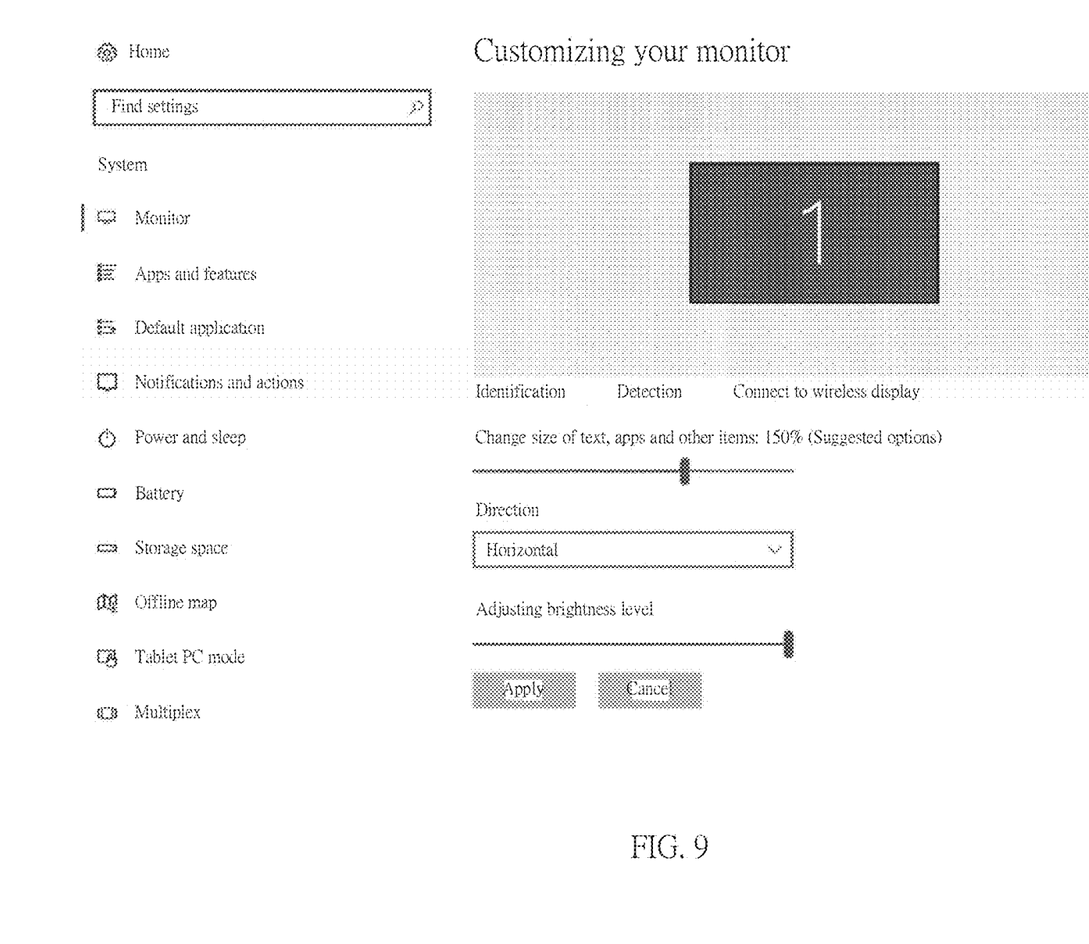
FIG. 9 illustrates a schematic diagram showing that only one display apparatus is shown on the display setting screen of the information processing apparatus PC when the transmitter TX is not coupled to the information processing apparatus PC.

Please refer to FIG. 8 and FIG. 9. When the transmitter TX in the video conferencing system 1 of the invention is not coupled to the information processing apparatus PC, there will be only one display/monitor shown in the device manager screen (as shown in FIG. 8) and the display setting screen (as shown in FIG. 9) of the information processing apparatus PC.

That is to say, when the information processing apparatus PC has not been coupled with the transmitter TX in the video conferencing system 1 of the invention, the information processing apparatus PC will only identify its own display/monitor as a display/monitor according to the EDID transmitted by its own display/monitor, so there will be only one display/monitor shown in the device manager screen (as shown in FIG. 8) and the display setting screen (as shown in FIG. 9) of the information processing apparatus PC.

Figure 10:
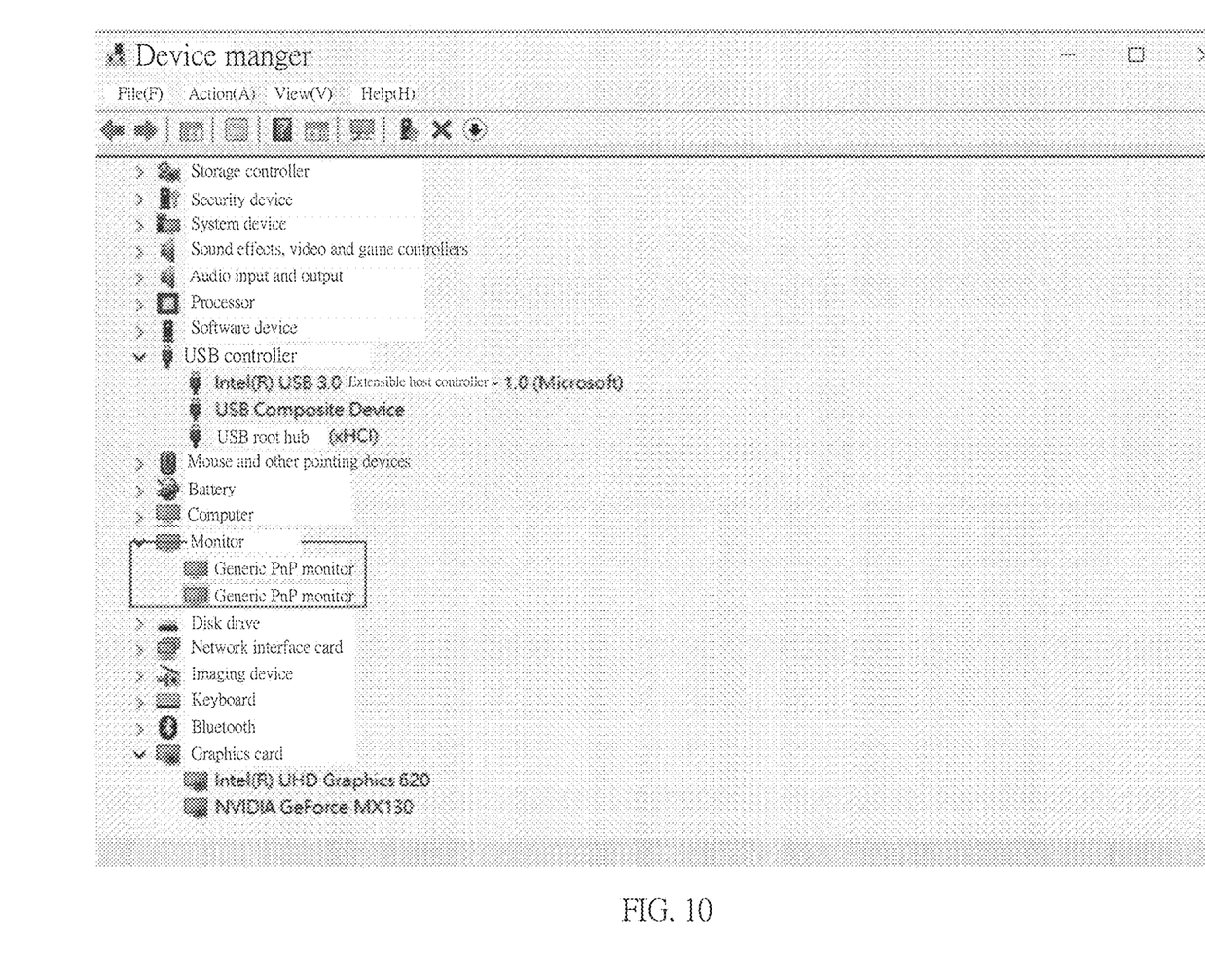
FIG. 10 illustrates a schematic diagram showing that two monitors shown on the device manager screen of the information processing apparatus PC when the transmitter TX has been coupled to the information processing apparatus PC.
Figure 11:
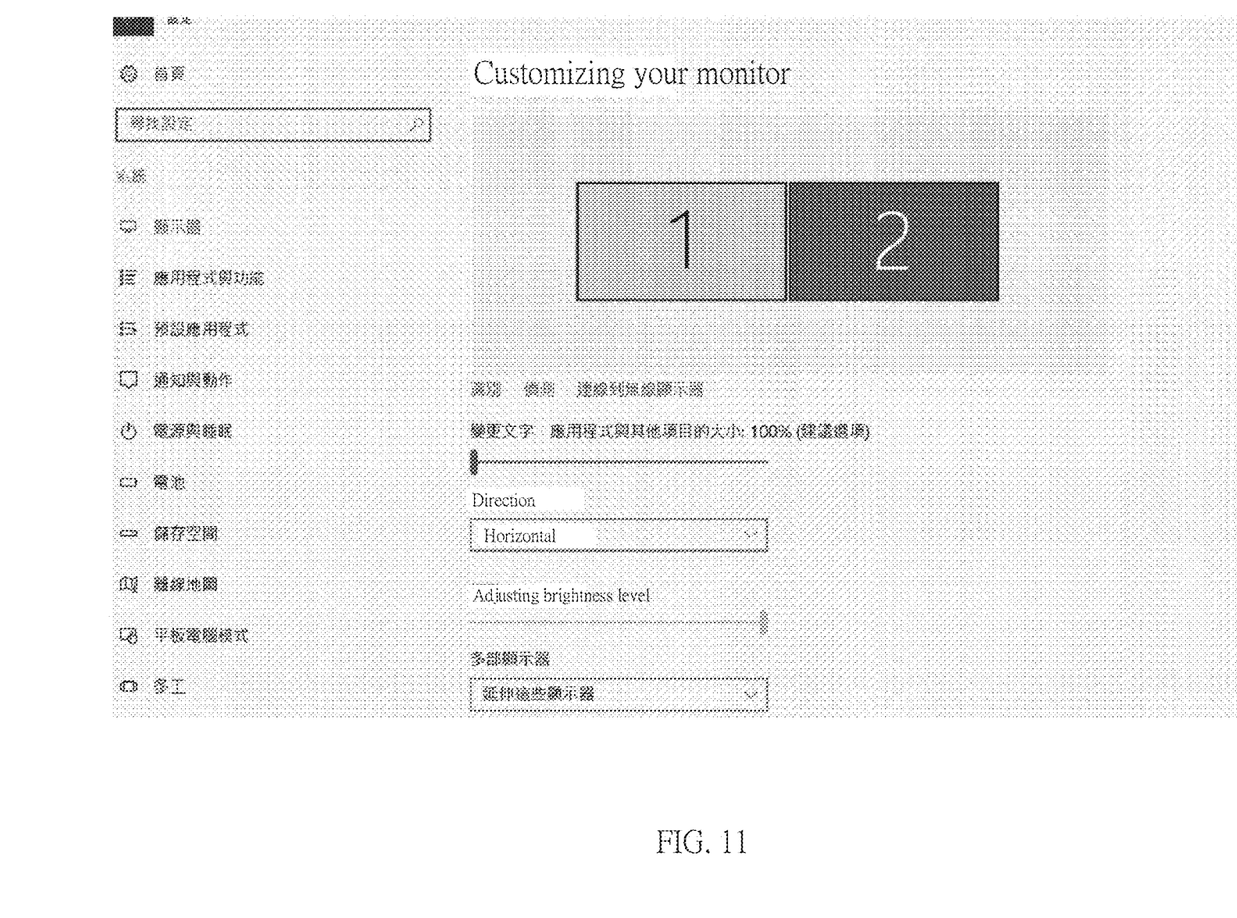
FIG. 11 illustrates a schematic diagram showing that two displays are shown on the display setting screen of the information processing apparatus PC when the transmitter TX is coupled to the information processing apparatus PC.

Next, please refer to FIG. 10 and FIG. 11. When the transmitter TX in the video conferencing system 1 of the invention has been coupled to the information processing apparatus PC, there will be two displays/monitors shown in the device manager screen (as shown in FIG. 10) and the display setting screen (as shown in FIG. 11) of the information processing apparatus PC.

That is to say, when the information processing apparatus PC has been coupled with the transmitter TX in the video conferencing system 1 of the invention, the information processing apparatus PC will not only detect its own display/monitor, but also identify the transmitter TX as another display/monitor according to the EDID transmitted by the transmitter TX, so there will be two displays/monitors, instead of only one display/monitor, shown in the device manager screen (as shown in FIG. 10) and the display setting screen (as shown in FIG. 11) of the information processing apparatus PC.

Figure 12:
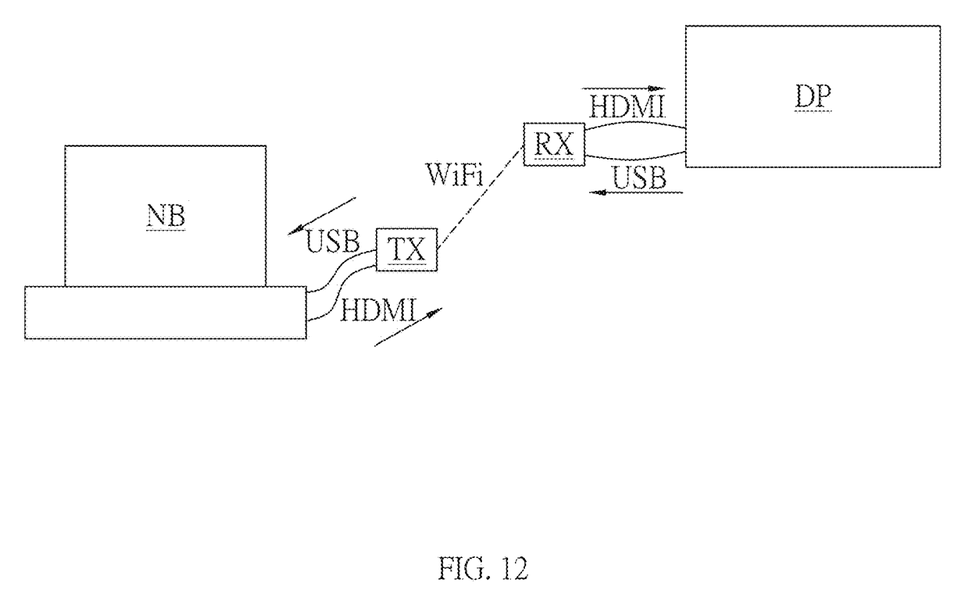
FIG. 12 illustrates a schematic diagram showing that the receiver RX is coupled to the display apparatus DP through a cable HDMI supporting a high-resolution multimedia interface and a USB cable supporting a universal serial bus.

Next, please refer to FIG. 12. FIG. 12 illustrates a schematic diagram showing that the receiver RX in the video conferencing system 1 of the invention is coupled to the display apparatus DP through a HDMI cable and a USB cable respectively.

As shown in FIG. 12, the transmitter TX in the video conferencing system 1 of the invention can be coupled to a notebook NB through a HDMI cable and a USB cable respectively; similarly, the receiver RX in the video conferencing system 1 of the invention can be coupled to the display apparatus DP via a HDMI cable and a USB cable respectively.

After the notebook NB identifies the transmitter TX as the virtual display apparatus according to the EDID transmitted by the transmitter TX, the transmitter TX can receive the image signal transmitted by the notebook NB through the HDMI cable and wirelessly transmit the image signal to the receiver RX in a form of a wireless signal (e.g., a Wi-Fi signal WiFi). Then, the receiver RX will transmit the image signal to the display apparatus DP through the HDMI cable, and then the display apparatus DP can display or project the image signal.

It should be noted that if the display apparatus DP is a touch display, when the display apparatus DP is touched, the receiver RX can receive a touch command transmitted by the display apparatus DP through the USB cable and wirelessly transmit the touch command to the transmitter TX in a form of a wireless signal (e.g., a Wi-Fi signal WiFi). When the transmitter TX wirelessly receives the touch command, the transmitter TX can transmit a human interface device (HID) command to the notebook NB through the USB cable, so that the notebook NB can execute corresponding function according to the HID command.

In practical applications, the receiver RX can receive a touch position information transmitted by the display apparatus DP through the cable supporting the USB type-C alternate mode and the transmitter TX can also transmit the HID command to the notebook NB through the cable supporting the USB type-C alternate mode, but not limited to this.

Figure 13:
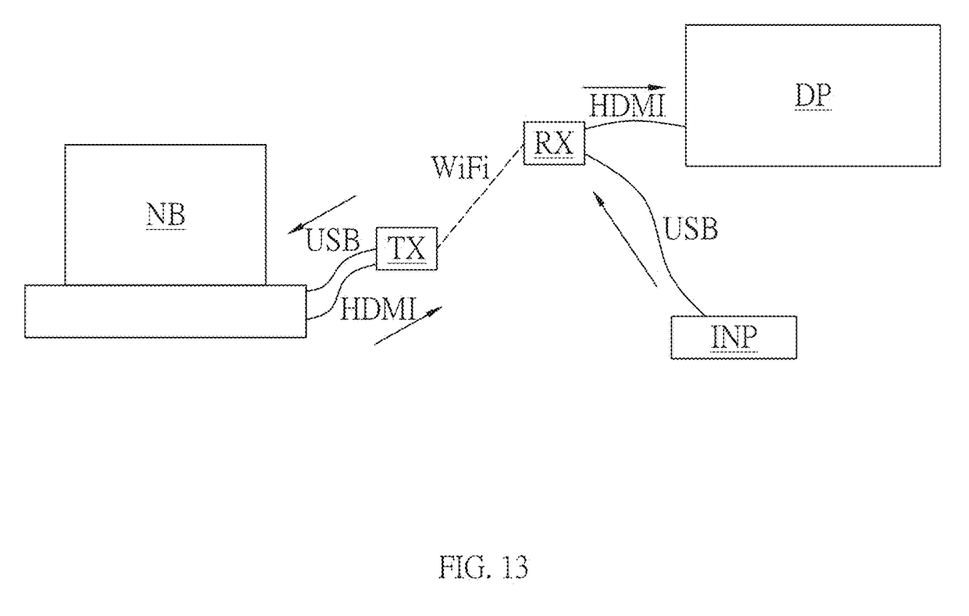
FIG. 13 illustrates a schematic diagram showing that the receiver RX is coupled to the display apparatus DP through the HDMI cable and coupled to the peripheral input apparatus INP through the USB cable.

Please also refer to FIG. 13. FIG. 13 illustrates a schematic diagram showing that the receiver RX in the video conferencing system 1 of the invention is coupled to the display apparatus DP through the HDMI cable and coupled to the peripheral input device INP through the USB cable.

As shown in FIG. 13, the transmitter TX in the video conferencing system 1 of the invention can be coupled to a notebook NB through the HDMI cable and the USB cable respectively; the receiver RX in the video conferencing system 1 of the invention can be coupled to the display apparatus DP through the HDMI cable and coupled to the peripheral input device INP (e.g., a keyboard or a mouse, but not limited to this) through the USB cable.

After the notebook NB identifies the transmitter TX as a virtual display apparatus according to the EDID transmitted by the transmitter TX the transmitter TX can receive the image signal transmitted by the notebook NB through the HDMI cable and wirelessly transmit the image signal to the receiver RX in a form of a wireless signal (e.g., a Wi-Fi signal WiFi). Then, the receiver RX can transmit the image signal to the display apparatus DP through the HDMI cable, and the display apparatus DP can display or project the image signal.

It should be noted that, since the receiver RX is coupled to the peripheral input device INP (e.g., the keyboard or the mouse, but not limited to this) through the USB cable, when the peripheral input device INP is operated by the user, the receiver RX can receive the HID command transmitted by the peripheral input device INP through the USB cable and wirelessly transmit the HID command to the transmitter TX; when the transmitter TX wirelessly receives the HID command, the transmitter TX can transmit the HID command to the notebook NB through the USB cable, so that the notebook NB can perform corresponding function according to the HID command.

In practical applications, the receiver RX can receive the HID command transmitted by the peripheral input device INP through the cable supporting the USB Type-C alternate mode and the transmitter TX can also transmit the HID command to the notebook NB through the cable supporting the USB Type-C alternate mode, but not limited to this.

Compared with the prior art, the video conferencing system and its transmitter of the invention can effectively improve shortcomings of the prior arts and provide the best wireless video conferencing effect. The advantages and functions of the invention are as follows:

(1) When the transmitter of the video conferencing system of the invention is coupled to the information processing apparatus, the transmitter will only transmit the EDID to the information processing apparatus, so that the information processing apparatus can identify the transmitter as the virtual display apparatus and only transmit the image signal to the transmitter; since neither the transmitter nor the information processing apparatus needs to install, execute or set any software or driver, it can achieve the real "plug and play" operation;

(2) As long as the electronic apparatus which the video conferencing system of the invention is coupled to can have a standard HDMI input; the video conferencing system of the invention can be compatible with all operating systems and hardware platforms, so that the presenter can use the content from different devices and media equipment to freely conduct presentations through any information processing apparatus, without the support of the information department to successfully conduct video conferences;

(3) In the video conferencing system of the invention, when the presenter wants to switch between the presentation mode and the video playback mode, he/she only needs to press a specific button on the transmitter to achieve wireless video playback with high-definition and stereo, it is very convenient for the presenter;

(4) The video conferencing system of the invention can also provide an extended desktop mode, so that the presenter can use the extended desktop to perform other tasks, such as reading notes, writing records, backing up data or monitoring applications while conducting presentations through the information processing apparatus; and (5) When the transmitter of the video conferencing system of the invention is coupled to the information processing apparatus, the transmitter using the EDID will automatically adjust the resolution settings of the information processing apparatus to meet the resolution settings of the display apparatus, so that the presenter can concentrate on the presentation without adjusting the resolution settings of the information processing apparatus.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A video conferencing system, coupled between an information processing apparatus and a display apparatus, the video conferencing system comprising:
   a transmitter, when the transmitter is coupled to the information processing apparatus, the transmitter transmitting an extended display identification data (EDID) to the information processing apparatus, so that the information processing apparatus identifying the transmitter as a virtual display apparatus according to the EDID and providing an image signal to the transmitter, and the transmitter wirelessly transmitting the image signal; and
   a receiver, coupled to the display apparatus, configured to wirelessly receive the image signal transmitted by the transmitter and provide the image signal to the display apparatus;
   wherein the receiver receives a human interface device (HID) command transmitted by the display apparatus or a peripheral input apparatus through a data transmission channel; the receiver wirelessly transmits the HID command to the transmitter, and the transmitter transmits the HID command to the information processing apparatus through the data transmission channel.

2. The video conferencing system of claim 1, wherein the transmitter is triggered by a trigger signal to wirelessly transmit the image signal to the receiver.

3. The video conferencing system of claim 1, wherein the transmitter comprises:
   an image receiving unit, configured to receive the image signal with the first format;
   a first control unit, coupled to the image receiving unit and configured to convert the image signal with the first format into the image signal with the second format; and
   a first wireless transmitting unit, coupled to the first control unit and configured to wirelessly transmit the image signal with the second format to the receiver.

4. The video conferencing system of claim 3, wherein the image receiving unit is a high-definition multimedia interface (HDMI) port and the first format is a HDMI format, or the image receiving unit receives the image signal with the first format and a power signal through a cable supporting universal serial bus (USB) Type-C alternate mode, and the first format is a DisplayPort format.

5. The video conferencing system of claim 3, wherein the receiver comprises:
   a second wireless transmitting unit, configured to wirelessly receive the image signal with the second format;
   a second control unit, coupled to the second wireless transmitting unit and configured to convert the image signal with the second format into the image signal with the first format; and
   an image output unit, coupled to the second control unit and the display apparatus respectively and configured to output the image signal with the first format to the display apparatus.

6. The video conferencing system of claim 1, wherein the information processing apparatus comprises a display card with a video interface, when the transmitter transmits the EDID to the information processing apparatus, the information processing apparatus performs a standard exchange with the EDID through the video interface of the display card.

7. The video conferencing system of claim 1, wherein the data transmission channel is a cable supporting a USB Type-C alternate mode.

8. The video conferencing system of claim 1, wherein the image signal outputted by the information processing apparatus to the transmitter has a first resolution, and the transmitter wirelessly transmits the image signal with the first resolution to the receiver; the receiver adjusts the first resolution of the image signal to a second resolution designated by the receiver and then the receiver outputs the image signal with the second resolution to the display apparatus.

9. A transmitter, applied to a video conferencing system, the video conferencing system further comprising a receiver, the transmitter comprising:
   an image receiving unit, when the transmitter is coupled to an information processing apparatus, the transmitter transmitting an extended display identification data (EDID) to the information processing apparatus, so that the information processing apparatus identifying the transmitter as a virtual display apparatus according to the EDID and providing an image signal with a first format to the image receiving unit;
   a first control unit, coupled to the image receiving unit and configured to convert the image signal with the first format into the image signal with a second format; and
   a first wireless transmitting unit, coupled to the first control unit and configured to wireless transmit the image signal with the second format to the receiver, and then the receiver providing the image signal with the second format to a display apparatus;
   wherein the receiver receives a human interface device (HID) command transmitted by the display apparatus or a peripheral input apparatus through a data transmission channel; the receiver wirelessly transmits the HID command to the transmitter, and the transmitter transmits the HID command to the information processing apparatus through the data transmission channel.

10. The transmitter of claim 9, wherein the transmitter is triggered by a trigger signal to wirelessly transmit the image signal to the receiver.

11. The transmitter of claim 9, wherein the image receiving unit is a high-definition multimedia interface (HDMI) port and the first format is a HDMI format, or the image receiving unit receives the image signal with the first format and a power signal through a cable supporting universal serial bus (USB) Type-C alternate mode, and the first format is a DisplayPort format.

12. The transmitter of claim 9, wherein the receiver comprises:

a second wireless transmitting unit, configured to wirelessly receive the image signal with the second format;

a second control unit, coupled to the second wireless transmitting unit and configured to convert the image signal with the second format into the image signal with the first format; and an image output unit, coupled to the second control unit and the display apparatus respectively and configured to output the image signal with the first format to the display apparatus.

13. The transmitter of claim 9, wherein the information processing apparatus comprises a display card with a video interface, when the transmitter transmits the EDID to the information processing apparatus, the information processing apparatus performs a standard exchange with the EDID through the video interface of the display card.

14. The transmitter of claim 9, wherein the data transmission channel is a cable supporting a USB Type-C alternate mode.

15. The transmitter of claim 9, wherein the image signal outputted by the information processing apparatus to the transmitter has a first resolution, and the transmitter wirelessly transmits the image signal with the first resolution to the receiver; the receiver adjusts the first resolution of the image signal to a second resolution designated by the receiver and then the receiver outputs the image signal with the second resolution to the display apparatus.

* * * * *